United States Patent [19]

Larsson

[11] Patent Number: 5,460,761
[45] Date of Patent: Oct. 24, 1995

[54] METHOD FOR TEMPERING A MOULDING TOOL

[75] Inventor: Owe G. T. Larsson, Hoganas, Sweden

[73] Assignee: AGA Aktiebolag, Lidingo, Sweden

[21] Appl. No.: 108,750

[22] PCT Filed: Mar. 4, 1992

[86] PCT No.: PCT/SE92/00135

§ 371 Date: Dec. 16, 1993

§ 102(e) Date: Dec. 16, 1993

[87] PCT Pub. No.: WO92/15439

PCT Pub. Date: Sep. 17, 1992

[30] Foreign Application Priority Data

Mar. 5, 1991 [SE] Sweden ................................ 9100663

[51] Int. Cl.$^6$ .................................................. B29C 45/73
[52] U.S. Cl. .................. 264/39; 249/79; 264/328.16; 264/335; 425/552; 425/437
[58] Field of Search .............................. 264/39, 40.6, 82, 264/83, 519, 528, 552, 219, 327, 328.16, 335; 425/144, 552, 437; 249/79, 80, 66 A

[56] References Cited

U.S. PATENT DOCUMENTS 4,139,177  2/1979  Hanning .................... 425/552

FOREIGN PATENT DOCUMENTS 3322312  1/1985  Germany .
4-74620  3/1992  Japan ........................................ 425/552

Primary Examiner—Jill L. Heitbrink
Attorney, Agent, or Firm—Scully, Scott, Murphy & Presser

[57] ABSTRACT

Method for tempering a moulding tool intended for production of products of natural or synthetic polymers, which moulding tool includes one or more moulding parts made of sintered metal with communicating pores obtained by pressing at a high pressure and sintering at a high temperature of a powdered material, in which moulding part or parts a moulding cavity has then been made, whereby preferably the outer envelope surface of the moulding tool is tight. The method comprises tightly connecting one or more channels, capillary tubes or the like through the tight outer envelop surface to the mould material of the moulding tool situated inside, which material contains a large number of small communicating pores and feeding a gas having a suitable state and a suitable temperature through the channels thereby causing a rapid tempering of the moulding tool to a desired extent.

13 Claims, 2 Drawing Sheets

METHOD FOR TEMPERING A MOULDING TOOL

BACKGROUND OF INVENTION

The present invention relates to a method for tempering a moulding tool intended for production of products of natural or synthetic polymers, which moulding tool comprises one or more moulding parts made of sintered metal with communicating pores. The moulding parts are obtained by pressing a powdered material at a high pressure and sintering at a high temperature. A moulding cavity has then been made in the moulding part or parts. Preferably the outer envelope surface of the moulding tool is tight.

DESCRIPTION OF PRIOR ART

From the Swedish publication SE-P-454247 it is known before to produce moulding parts of sintered metal, whereby the moulding parts get communicating pores. A moulding cavity is produced in the moulding parts, which together constitute a mould intended for production of products of natural or synthetic polymers by injection moulding.

When the moulding cavity has been completed the envelope surfaces are tightened. The center of said known invention consists in the formation of a reservoir in the pore system of the mould for temporary reception of air or another gas formed at the injection moulding. When the mould is opened after each production cycle the gas i released again from the reservoir.

The known process disclosed above works very well. At some applications there are, however, difficulties in regulating the temperature in the different parts of the moulding tool. Moreover, in certain cases the pores will be clogged by by-products formed at the moulding of the polymer products.

For instance at injection moulding of thermoplasts in steel moulds, often about 80% of the production cycle, consists of cooling time. The thermoplast is injected via a gate or another nozzle into the moulding cavity at a temperature of about 90° C.–300° C. The plastic product is cooled in the moulding cavity by conduction and the heat is removed by water cooling in channels situated outside the moulding cavity or drilled into the mould steel.

When cooling channels are placed in the mould steel, you often get the problem that they make the mould construction weaker. Of course, this is especially true for small areas. A weak mould construction cannot be accepted. Therefore, certain areas of the mould are not provided with cooling channels, which of course results in an insufficient cooling.

Another considerable problem is to be able to arrange cooling channels in connection with a complex moulding cavity. This results in an uneven cooling or tempering of the moulding cavity and also a deterioration of the quality of the plastic product.

Another very frequent problem, especially at the production of big products, is that the flow paths i.e. the distance from the injection site to the middle of the product is so long that the plastic is cooled to much before it has filled the whole cavity. Then, often certain inner parts of the cavity will get defects in respect of the moulded plastic.

Thus, an uneven tempering of the moulding cavity is a big problem both at the moulding of thermoplasts and thermosets.

In the U.S. Pat. No. 5,021,203 a method for solving the above tempering problem and the problem with clogging of the pores is disclosed. Then the temperature is regulated in a moulding tool intended for the production of products of natural or synthetic polymers.

The moulding tool comprises one or more moulding parts made of sintered metal with communicating pores obtained by pressing a powdered material at a high pressure and sintering at a high temperature. A cavity has then been made in the moulding part or parts. The pores are open towards the moulding cavity while the outer envelope surface of the moulding tool is tightened against leakage.

A heating buffer is arranged in the moulding tool by filling the communicating pores with a liquid with a high vaporizing temperature. The pressure on the liquid in the pores is regulated by means of a suitable pressure producer connected with the communicating pores in the moulding tool. The pressure is arranged to be automatically increased to counteract the inner pressure of the mould against the liquid in the pores when polymer is introduced into the closed moulding tool. The pressure is then automatically decreased when the moulding tool is opened again and the inner pressure of the mould is released. In this way the pores will preferably be filled with the above liquid during the whole production cycle.

The liquid prevents the pores from being clogged by by-products formed at the moulding of the polymer products or by fillers etc in the polymer material used. Accordingly, such by-products will be included in the polymer product instead of clogging the pores in the porous moulding parts of the moulding tool.

The liquid is intended for absorbing air, steam and other gases which are possibly formed at the moulding. These gases can then be released from the liquid when the moulding tool is opened after each production cycle.

Since the liquid is evenly distributed in the whole pore system an even tempering of the moulding tool is obtained.

If necessary the moulding tool can be heated or cooled by outside aggregates and/or by circulating a temperature regulating medium via channels with tight walls arranged in the porous moulding parts or any other parts of the moulding tool.

Usually, the temperature in the moulding tool is regulated to between about +20° C. and about +170° C. However, of course it is possible to work outside said interval too. The limit upwards in temperature is the vaporizing temperature of the liquid used.

Thus, according to the U.S. Pat. No. 5,021,203 a temperature levelling effect in the moulding tool is obtained by distribution of a liquid with a high vaporizing temperature in the communicating pores.

SUMMARY OF INVENTION

Sometimes it is desirable to be able to temper a moulding tool in a more careful way to bring about optimal moulding conditions and thereby the shortest possible production cycle for the moulded polymer products produced.

According to the present invention it has been possible to satisfy the above desire and bring about a method for tempering a moulding tool intended for production of products of natural or synthetic polymers, which moulding tool includes one or more moulding parts made of sintered metal with communicating pores obtained by pressing at a high pressure and sintering at a high temperature of a powdered material, in which moulding part or parts a moulding cavity has then been made, whereby preferably the outer envelope surface of the moulding tool is tight. The method comprises tightly connecting one or more channels, capillary tubes or the like through the tight outer envelop surface to the mould material of the moulding tool situated inside, which material contains a large number of small communicating pores and feeding a gas having a suitable state and a suitable temperature through the channels thereby causing a rapid tempering of the moulding tool to a deserid extent.

According to one embodiment of the invention cold or warm gas is fed through the channels.

According to another embodiment gas in liquid state is fed through the channels. The liquid is transformed to gaseous state by expansion in the moulding tool outside the channels, whereby a strong cooling of the moulding tool is obtained.

At both embodiments the gas used can consist of carbon dioxide, nitrogen, air or another gas. Of course the liquid state phase of the gas used can be obtained in a usual way by compressing the gas phase.

According to one embodiment of the invention, where liquid state gas is used, the moulding tool is provided with at least one expansion room made inside the outer tight envelop surface. A capillary tube or a channel for the charged liquid state gas runs into the expansion room. The liquid will expand to gaseous state in the expansion room and then disperse through the communicating pores at cooling of the moulding tool.

The capillary tube or the channel can either run freely into the expansion room or bear against the porous wall of the moulding tool. In both cases it is important that the expansion room is tightened in respect of leakage against the outer envelop surface of the moulding tool.

The moulding tool can be provided with one, two or more expansion rooms with accompanying capillary tubes or channels depending on the size of the moulding tool, the desired cooling effect etc. At the use of a moulding tool consisting of one movable and one stationary part it is often suitable to have one expansion room in each of the two parts.

The capillary tubes can also have another function in addition to that disclosed above. Thus, they can also be used for evacuation of enclosed air and/or other gases from the moulding cavity out of the mould. These gases are often formed at the moulding of the polymer.

Accordingly, at injection moulding it is suitable as a first measure, when the mould has been closed and the plastic has been injected, to evacuate the gas released from the polymer via the capillary tubes and then feed the cooling liquid state gas or cold gaseous state gas through the capillary tubes.

At another embodiment of the invention selected parts of the envelope surface are open. Then the released gas can be evacuated through the wall of the mould. Preferably this alternative is used together with capillary tubes used for the same purpose as mentioned above. Usually, the envelope surface is tight in the area around the capillary tube to give the best effect of the tempering medium fed through the capillary tube. Thus, the tempering gas will disperse through the pores of the mould and not escape so quickly out of the mould again via the open parts of the envelope surface if said open parts are situated a certain distance from the inlet of the capillary tube.

For instance if two capillary tubes with accompanying expansion rooms are used the temperature regulating gas can be fed in one capillary tube while enclosed air and/or gas released from the polymer can be evacuated via the other tube.

The moulding cavity can be made in such a way that the pores are open or closed towards the moulding cavity. It is also possible to construct the moulding cavity in such a way that one area of pores bordering on the moulding cavity will be closed while another area of these pores will be open.

If any portion of the pores bordering on the moulding cavity are open, of course the temperature regulating gas will get into contact with the plastic product produced at the moulding. When the mould is then opened gas will stream out through the pores and into the moulding cavity. This gas streaming into the moulding cavity can be used for ejecting the product produced out of the mould when the mould is opened after each moulding cycle. Thereby the usual mechanical or pneumatic ejectors in the moulding tool can often be omitted. This will decrease the cycle time which includes the time for ejection. Mechanical and pneumatic ejectors namely give inconvenient marks on the products made if the polymer has not cooled down sufficiently before the ejection of the product. In order to avoid such problems it is therefore necessary at conventional processes to have a longer cooling time than according to the invention where the gas ejects the moulded product. The gas will be distributed over a large surface, possibly the whole surface of the product and gives no marks.

If mechanical or pneumatic ejectors are used as a complement they can be operated with a lower pressure or be placed at a more convenient spot since the gas will assist at the ejection of the moulded product. Thus, also in this case the cooling time and thereby the cycle time can be decreased as compared with conventional methods.

According to one embodiment of the invention the temperature in the moulding tool can be regulated to the desired level by alternately feeding warm or cooling gas through the channels.

At another suitable embodiment of the invention warm gas is charged through the channels before filling the moulding cavity with polymer. When the moulding cavity has been filled with polymer the moulding tool is then cooled by feeding gaseous or liquid state gas through the channels. Thereby the cycle time for the production of each polymer product is decreased maximally. Since the temperature can be regulated in this way also the polymerization reactions can be influenced and directed at an optimal temperature.

In the preheated moulding tool the polymer will be kept at a higher temperature for a longer time which results in a low viscosity at the filling of the mould. Thereby the mould will be filled easily and quickly. In spite of that the cooling time can be short depending on the above effective cooling with gas.

For instance at injection moulding of thermoplast the low viscosity of the polymer is useful since injection moulding machines with a lower injection pressure than usual can be adopted. Of course the investment costs will be decreased considerably if such smaller injection moulding machines can be used.

At the last-mentioned alternative warm gas can be supplied via the channels already at the ejection of the polymer product. Thereby the cycle time will be extremely short.

Preferably the plastics material used consists of a thermoplast such as polypropylene, polyvinyl chloride, polyethylene, polystyrene and polyethylene terephthalate or an ionomeric thermoplast such as ethylene-acrylate polymer. However, the invention works very well independent on which polymer that is to be used in the moulding tool. Therefore, it is also possible to use thermosets such as polyester, phenolic plastic and amino plastic by means of the method according to the invention.

At the moulding of polypropylene by means of the method according to the invention, products having a greater transparency than usual can be obtained. This positive effect depends on the extreme cooling possibility according to the invention. For instance as compared to polyvinyl chloride, polypropylene has got many positive properties not least from an environmental point of view. Since polyvinyl chloride can be moulded without problems to products as clear as glass said plastic has been used for many applications where polypropylene has been used to a very low extent. Thus, the present invention is epochmaking in respect of using polypropylene for the production of plastic bottles for instance.

Suitably the temperature of the moulding tool can be regulated to +200° C. to −25° C.

The moulding tool tempered according to the invention is intended for injection moulding, compression moulding, blow moulding, extrusion, thermo moulding or foiling.

BRIEF DESCRIPTION OF THE DRAWINGS

The present invention will be explained further in connection with the embodiment examples below and the enclosed figures of which FIG. 1 in a simplified form shows a cross-section of an injection moulding tool and certain peripheral equipment used at an embodiment of the invention.

DETAILED DESCRIPTION OF THE INVENTION

Figure 1:
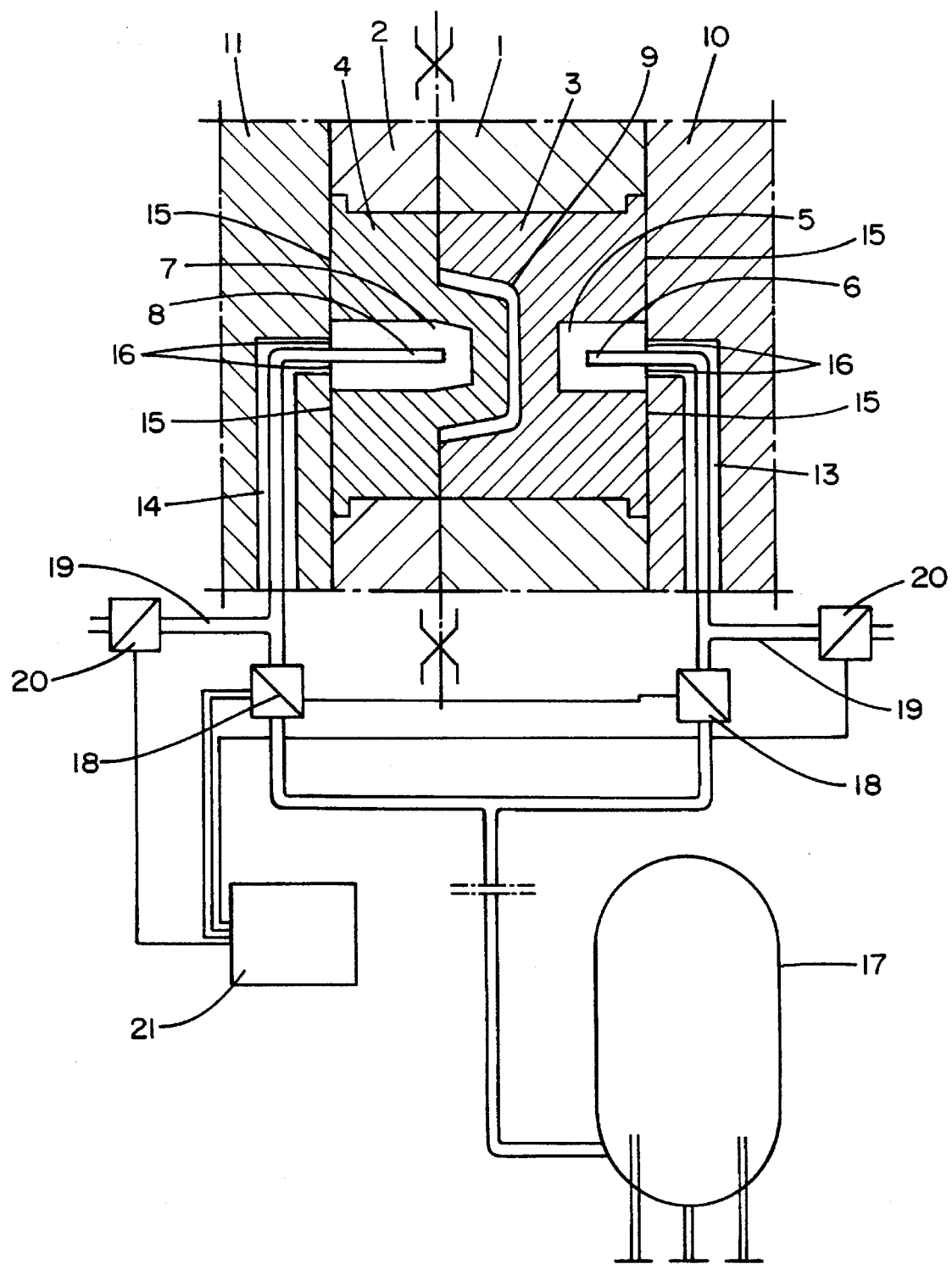

On FIG. 1 an injection moulding tool comprising one mobile half 1 and one stationary half 2 is shown. Each moulding half comprises a moulding part 3, 4 made of a porous sintered material with communicating pores as disclosed above. In the part 3 there is an expansion room 5 whereinto a capillary tube 6 runs. Also the part 4 contains an expansion room 7 whereinto a capillary tube 8 runs. The capillary tubes 6 and 8 run freely into the expansion rooms 5 and 7 respectively and stop a short distance from the inner wall of the expansion rooms.

Between the moulding halves 1 and 2 a moulding cavity 9 is formed. The moulding parts 3 and 4 have pores which are open towards the moulding cavity 9. At the outside the moulding parts 3 and 4 are provided with non-porous moulding parts 10 and 11 respectively on all sides. Recesses 13 and 14 for the capillary tubes 6 and 8 respectively have been made in the moulding parts 10 and 11.

Sealings 15 are arranged between the parts 3 and 10 and 4 and 11 respectively. Sealings 16 are also arranged between the outer surfaces of the capillary tubes 6, 8 and the recesses 13 and 14 respectively.

A container 17 with liquid carbon dioxide is connected to the capillary tubes 6, 8. The supply of gas can be regulated by hand valves 18. Gaseous state cooling gas, air and/or gases formed at the moulding of the plastic can be evacuated via pipes 19 and hand valves 20.

The addition of liquid state cooling gas, evacuation of gaseous state cooling gas and gases possibly formed from the polymer as well as the opening and the closing of the moulding tool etc can be directed by means of a control unit 21.

Figure 2:
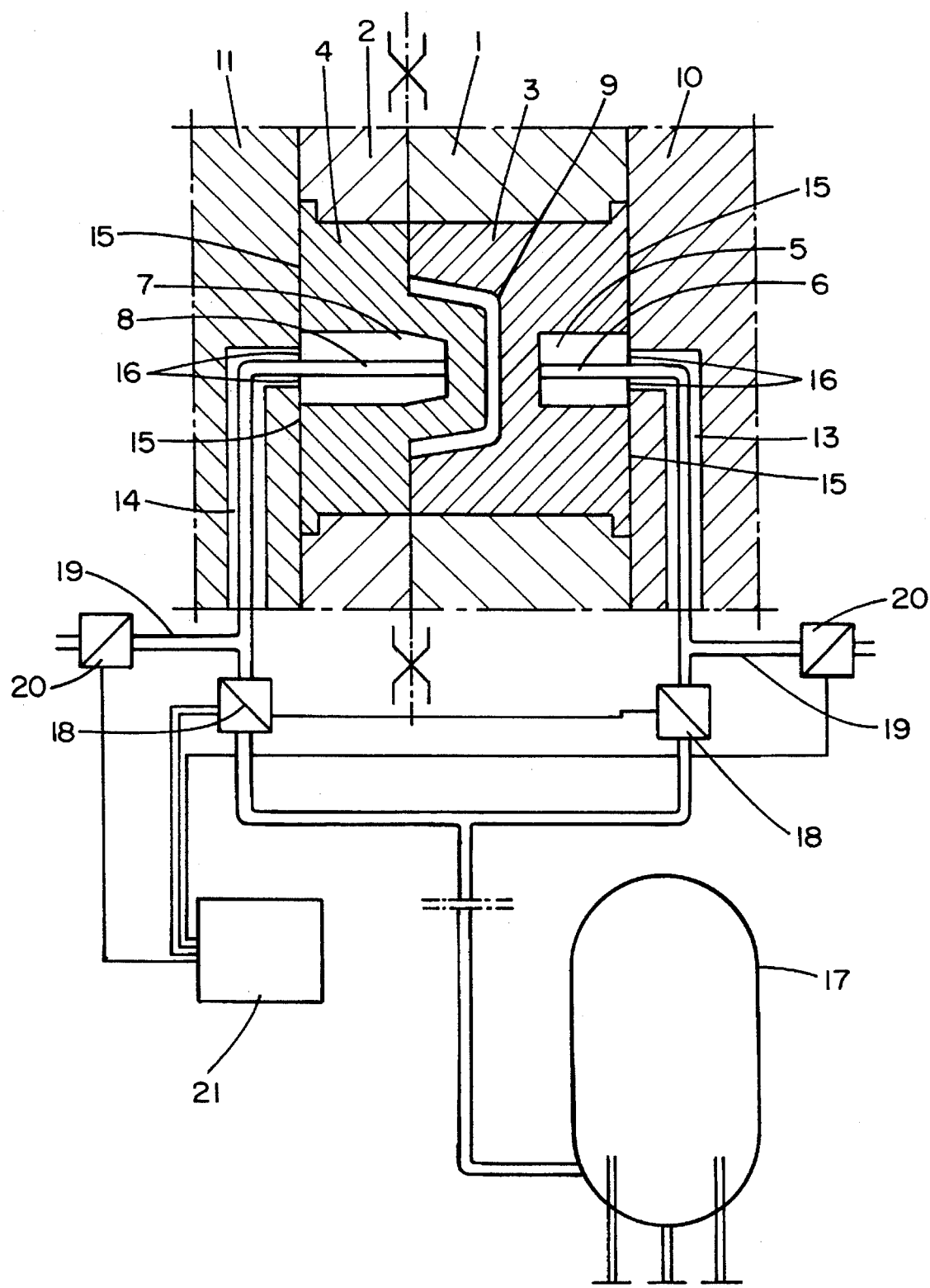
FIG. 2 shows a modification of the device according to FIG. 1.

The moulding tool according to FIG. 2 corresponds exactly to that according to FIG. 1 with the exeption that the capillary tubes 6, 8 do not run freely into the expansion rooms 5 and 7 respectively but reach all the way to the inner wall of the expansion rooms. The same reference numerals are used for corresponding details on the two figures.

Example 1 shows injection moulding of a small lid of polypropylene by means of a moulding tool designed according FIG. 1, whereby the moulded product is ejected out of the mould by means of a tempering gas. Example 2 illustrates injection moulding of a pump membrane whereby the membrane is ejected out of the mould by means of a tempering gas. Example 3 shows production of a partition wall of polypropylene whereby the production cycle is decreased by local cooling of the injection site according to one embodiment of the invention.

EXAMPLE 1

An injection moulding tool according to FIG. 1 was used for the production of a small lid of polypropylene. Then the moulding tool was first closed whereupon the polymer material was injected. Liquid state carbon dioxide was fed via the capillary tubes 6 and 8. Then the liquid state carbon dioxide was transformed to gaseous state by expansion in the expansion rooms 5 and 7. The gas was immediately distributed in the communicating pores of the moulding parts 3 and 4 whereby a strong cooling effect was obtained. Thus, the temperature in these parts decreased to −10° C.

The moulding tool was opened whereupon a supplementary addition of liquid carbon dioxide was charged via the capillary tube 8. The liquid carbon dioxide was then transformed to gas in the expansion room 7. The gas was immediately distributed in the communicating pores of the part 4, resulting in an ejection of the plastic product out of the moulding tool, whereupon the production cycle was repeated. The plastic products produced were rather transparent. The intended temperature in the moulding cavity 9 was regulated by means of a thermoelement (not shown on the figures) applied in the moulding cavity or near thereto. The amount of cooling gas needed for keeping the desired low temperature was regulated by means of the control unit 21 in co-operation with the thermoelement.

The cycle time was 9 seconds at the above injection moulding by means of an injection moulding tool according to the invention.

At the production of the same product in a conventional injection moulding tool not provided with any moulding parts with communicating pores according to the invention and only cooled with water the cycle time was 14 seconds.

Thus, the method according to the invention results in an extraordinary saving of time which decreases the cost per injected moulded product to the corresponding degree.

EXAMPLE 2

An injection moulding tool with the same principal design as according to FIG. 1 except for a few modifications was used for the production of a pump membrane of polyurethane. The membrane had a circular surface with a thickness of about 15 mm and a diameter of about 180 mm.

In this case the injection moulding tool was provided with two capillary tubes 6 which ran into two different spots of the moulding part 3 and two capillary tubes 8 which ran into two different spots of the moulding part 4.

Of course the cross-section of the moulding cavity was mainly rectangular in this case and not designed as shown in FIG. 1.

First the moulding tool was closed, whereupon the polymer material was injected. Liquid carbon dioxide was then fed via the capillary tubes 6 and 8. The liquid carbon dioxide was then transformed to gas by expansion in the expansion rooms 5 and 7. The gas was immediately distributed in the communicating pores of the moulding parts 3 and 4, whereby a strong cooling effect was obtained.

Then the moulding tool was opened, whereupon liquid carbon dioxide was fed via the capillary tubes 6 in a supplementary addition. The liquid carbon dioxide was transformed to gas in the expansion rooms 8. The gas was immediately distributed in the communicating pores in the part 3, resulting in an ejection of the plastic product out of the moulding tool, whereupon the production cycle was respected.

The membrane produced was totally perfect without any dents, porosity or inclusions of air.

The production velocity at the above injection moulding by means of an injection moulding tool according to the invention was 36 membranes produced per hour. The reject rate was 0%.

At the production of the same product in a conventional injection moulding tool not provided with any moulding parts with communicating pores according to the invention and only cooled with water the production velocity was 30 products per hour. Moreover, it was necessary to reject 40% of the membranes produced.

At the conventional production of the membrane it often got stuck in the stationary mould half depending on a vacuum effect and an adhesion. Then it had to be removed with a tool such as screw-driver. This caused the above high reject rate due to non-acceptable marks from these tools in the membranes. Moreover, problems with removal of air often occurred at the production, which often resulted in air blisters and porosity of the membranes.

These problems can be avoided completely according to the invention. The membrane is easily ejected by means of the gas. The problems with removal of air are also solved. Of course the decreased cassation in combination with a decreased cycle time according to the invention results in a considerably improved production not least from an economical viewpoint.

EXAMPLE 3

In a conventional injection moulding tool with water cooling partition walls of polypropylene for a drawer were made. The cycle time became long, 27.4 seconds due to overheating in the heat-channel gate.

A minor change of the moulding tool was made by making a small recess in one moulding half opposite to the runner gate. In said recess a porous moulding part of sintered material according to the invention was placed. The moulding part was shaped like a casing and placed with the opening downwards. A capillary tube ran into the casing.

First the moulding tool was closed whereupon the polymer material was injected. Liquid carbon dioxide was then fed via the capillary tube. The liquid carbon dioxide was transformed to gas by expansion inside the casing formed part. The gas was immediately distributed in the communicating pores of the casing formed part, whereby a strong cooling effect was obtained in the area of the runner gate. The cycle time became 20.2 seconds.

The tool was opened again and the partition wall produced was removed. The moulding tool was closed and the cycle was repeated.

The present invention is not limited to the embodiments shown, since these can be modified in different ways within the scope of the invention.

I claim:

1. A method of tempering a molding tool comprising (a) introducing molten polymer into a molding cavity formed by at least two molding members, wherein at least one of said molding members is made of sintered metal having communicating pores, at least one of said pores being open toward said molding cavity; (b) introducing a coolant gas, said gas selected from the group consisting of carbon dioxide, nitrogen and air, into an expansion room provided in said porous molding member by means of at least one channel or capillary tube which passes through a tight envelope surface, said expansion room in communication with said communicating pores, whereby said molten polymer is solidified into a polymeric article in said molding cavity solely by said coolant gas; and (c) opening said molding tool.

2. A method in accordance with claim 1 comprising (d) introducing a gas, said gas selected from the group consisting of carbon dioxide, nitrogen and air, into said expansion room subsequent to the opening of said molding tool.

3. A method in accordance with claim 2 wherein said gas introduced into said expansion room in said step (d) is warm.

4. A method in accordance with claim 3 including (e) introducing a warm gas, said gas selected from the group consisting of carbon dioxide, nitrogen and air, into said expansion room, when said molding tool is closed, prior to said step (a).

5. A method in accordance with claim 2 wherein said gas introduced into said expansion room in said step (b) is in the liquid state in said channel or capillary tube and wherein said gas introduced into said expansion room in said step (d) is in the gaseous state in said channel or capillary tube.

6. A method in accordance with claim 1 wherein said polymeric material is a thermoplastic selected from the group consisting of polypropylene, polyvinyl chloride, polyethylene, polystyrene and polyethylene terephthalate; a thermosetting resin selected from the group consisting of polyesters, phenolic plastics and amino plastics; or an ionomeric thermoplastic.

7. A method in accordance with claim 6 wherein said polymeric material is high transparency polypropylene.

8. A method in accordance with claim 2 wherein said introduction of said polymeric material into said molding cavity of said molding tool in step (a) is by injection.

9. A method in accordance with claim 4 wherein said molding tool temperature in said steps (a) to (e) varies from −25° C. to 200° C.

10. A method in accordance with claim 1 wherein all said pores of said sintered metal member are open toward said molding cavity.

11. A method in accordance with claim 10 wherein two mold members are employed and are both formed of sintered metal.

12. A method in accordance with claim 1 wherein gas introduced in said molding cavity, forced out of said cavity in said step (a), and said coolant gas, introduced in said step (b), are evacuated through said channel or capillary tube.

13. A method in accordance with claim 2 wherein said step (d) serves also to eject said polymeric article from said mold cavity.

\* \* \* \* \*